US008579314B2

(12) United States Patent  (10) Patent No.: US 8,579,314 B2
Prazen et al.  (45) Date of Patent: Nov. 12, 2013

(54) REMOVABLE MUD FLAP ASSEMBLY AND METHODS OF USE

(76) Inventors: Frank Dan Prazen, Marble, CO (US); Raymond S. Cross, Redstone, CO (US)

(*) Notice: Subject to any disclaimer, the term of this patent is extended or adjusted under 35 U.S.C. 154(b) by 127 days.

(21) Appl. No.: 13/214,203

(22) Filed: Aug. 21, 2011

(65) Prior Publication Data

US 2013/0168953 A1  Jul. 4, 2013

(51) Int. Cl.
*B62D 25/18* (2006.01)

(52) U.S. Cl.
USPC .......................................... 280/154; 280/851

(58) Field of Classification Search
USPC .............. 280/847, 848, 153.5, 154, 849, 851, 280/156, 157, 159; 248/222.11; 403/109.2
See application file for complete search history.

(56) References Cited

U.S. PATENT DOCUMENTS

| | | | | |
|---|---|---|---|---|
| 487,544 | A | * | 12/1892 | Simon ...................... 296/107.14 |
| 2,777,710 | A | * | 1/1957 | Panchesine ................... 280/851 |
| 3,700,260 | A | | 10/1972 | Moore |
| 3,711,119 | A | | 1/1973 | Hollingsworth |
| 3,726,544 | A | | 4/1973 | Miller |
| 3,778,086 | A | | 12/1973 | Moore |
| 3,782,757 | A | | 1/1974 | Juergens |
| 3,799,580 | A | * | 3/1974 | McGuire ...................... 280/851 |
| 3,877,722 | A | | 4/1975 | Conner |
| 3,934,901 | A | | 1/1976 | Hammerly |
| 4,033,599 | A | * | 7/1977 | Fusco ........................... 280/851 |
| 4,097,090 | A | | 6/1978 | Payne |
| 4,165,092 | A | | 8/1979 | Herlein |
| 4,326,727 | A | * | 4/1982 | Rock ............................. 280/851 |
| 5,121,944 | A | | 6/1992 | Haddox |
| D328,447 | S | | 8/1992 | Ahleen |
| D330,692 | S | | 11/1992 | Hammond, Jr. |
| 5,316,191 | A | * | 5/1994 | Gibson et al. .................. 224/401 |
| 5,460,412 | A | | 10/1995 | Vincent |
| D415,086 | S | | 10/1999 | Larkin |
| 5,967,553 | A | | 10/1999 | Cominsky |
| 6,135,502 | A | | 10/2000 | Howe |
| 6,179,311 | B1 | | 1/2001 | Larkin |
| 6,485,059 | B2 | | 11/2002 | Burnstein |
| 6,527,288 | B2 | | 3/2003 | Abercrombie |
| 6,575,656 | B2 | * | 6/2003 | Suh ............................ 403/109.6 |
| 6,623,038 | B2 | | 9/2003 | Heem |
| 6,994,376 | B1 | | 2/2006 | Deering |
| 6,997,633 | B2 | * | 2/2006 | Thomas et al. ............ 403/109.6 |
| 7,097,380 | B2 | * | 8/2006 | Lee ............................. 403/109.2 |
| 7,226,086 | B2 | | 6/2007 | Haynes |
| 7,578,526 | B2 | | 8/2009 | Jaeger |
| 7,607,698 | B2 | | 10/2009 | Cicansky |
| D661,620 | S | * | 6/2012 | LeRoux ....................... D11/220 |
| 2004/0140663 | A1 | | 7/2004 | Barr |
| 2005/0110266 | A1 | | 5/2005 | Barr |
| 2005/0212282 | A1 | | 9/2005 | Markham |
| 2008/0310179 | A1 | | 12/2008 | Bates |

* cited by examiner

*Primary Examiner* — Frank Vanaman
(74) *Attorney, Agent, or Firm* — Leyendecker & Lemire, LLC (57) ABSTRACT

A removable mud flap assembly adapted to rapid and facile removal of a flap member from a wheeled vehicle or trailer is described. The removable mud flap assembly includes a bracket assembly having a fixed structure affixed to the vehicle or trailer, and a removable structure affixed to the flap member. The removable structure securely engages the fixed structure to form an intact bracket assembly, and is adapted to readily disengage from the fixed structure, thereby enabling the flap member to be quickly and easily removed from the vehicle. The flap member is typically, but not necessarily, removed from the vehicle by one person in a few seconds, without the use of tools.

15 Claims, 9 Drawing Sheets

REMOVABLE MUD FLAP ASSEMBLY AND METHODS OF USE

FIELD OF THE INVENTION

The present invention relates generally to mud flaps for trucks, road tractors, pickup trucks, and other motor vehicles, and trailers and semi-trailers.

BACKGROUND

Trucks, road tractors, and other vehicles often have mud flaps disposed behind some or all of their wheels in order to help prevent or diminish material from being thrown, launched, or otherwise propelled into the air by the wheels. The material includes, but is not limited to, rocks, debris, water, and road slop. However, the mud flaps can obstruct access to wheels and tires. The obstructed access can impede tire or wheel maintenance and can make installation of tire chains more difficult and time consuming.

Under some adverse conditions, drivers must install tire chains in order to drive their vehicles safely and effectively. The adverse conditions include, but are not limited to, slick road surfaces caused by snow, freezing rain, hail, and mud. In some cases, installation of tire chains is mandatory before trucks, road tractors, or semi-trailer trucks are permitted to travel on roads having sharp turns or steep grades.

Installing tire chains is often performed roadside in inclement weather, and the presence of mud flaps can necessitate an installer lying on a wet, icy, or snow packed road while installing tire chains. Under these arduous conditions, with access to vehicle wheels impeded by mud flaps, the chains are often poorly installed. Consequently, the poorly installed chains can be damaged or shed from the vehicle wheels as the vehicle is driven. A vehicle that has shed or damaged its tire chains may be stranded or endangered by a resulting lack of traction. Improvements that facilitate wheel access for vehicles equipped with mud flaps are thus in demand, and would be most beneficial for installation of tire chains and vehicle maintenance.

DETAILED DESCRIPTION

Embodiments of the present invention comprise vehicle mud flap assemblies having flap members that are quickly and easily removable from the vehicles on which the mud flap assemblies are installed. The flap members are similarly easy to re-install. Vehicles on which the removably mud flap assemblies are typically installed include motor vehicles, trailers, and semi-trailers. Embodiments of removable mud flap assemblies include flap members that can be readily removed or re-installed by one person, even where the flap members reside behind the drive wheels of a road tractor coupled to a semi-trailer. The one person can typically remove or install one of the flap assemblies in about 10 seconds or less, without having to loosen or remove a threaded fastener or reach between the flap member and a wheel the flap member is shielding. A flap member is considered to be shielding a wheel where the flap member resides immediately behind the wheel, as is familiar to persons skilled in the art, so as to prevent or reduce the chances of the wheel throwing, launching, or otherwise propelling material into the space surrounding the truck. The flap member typically shields the wheel by deflecting the material down toward the ground or back toward the wheel. The material includes, but is not limited to, rocks, debris, water, or road slop In some embodiments, the flap member of the removable mud flap assembly is adapted to be removed or re-installed very quickly by hand without using a hand tool. Hand tools include, but are not limited to, screw drivers, star head screw drivers or star bits, spanners, wrenches, pliers, locking pliers, hex wrenches, sockets, socket wrenches, and adjustable wrenches. The removable mud flap assemblies are advantageous where a driver needs to install or uninstall tire chains. The driver can quickly remove flap members without manipulating fasteners that are difficult to reach, and without laying on the ground or pavement. Installation of the tire chains is simplified and proper chain installation facilitated by having the flap members removed, and the driver can quickly and easily re-install the flap members after the tire chains are installed. The same advantages are present when uninstalling tire chains. Thus the driver's exposure to the elements, road slop, and hazards of traffic are minimized by the removable mud flap assemblies. The aforementioned advantages may be especially beneficial when the weather is inclement, as is frequently the case where chains are required or desired. Road slop includes, but is not limited to, snow, ice, slush, road salt, magnesium chloride, dirt, dust, and gravel.

The removable mud flap assembly is also advantageous for facile removal of the flap member to enhance access for vehicle maintenance and service, and for washing the flap member. Examples of maintenance or service includes, but is not limited to, maintenance or service of tires, wheels, suspension components, drive train components, brakes, and undercarriage components.

TERMINOLOGY

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The terms "removable," "removably coupled," "readily removable," "detachable," "detachably coupled," and similar terms, as used in this specification and appended claims, refer to objects or structures that can be uncoupled from an adjoining object or structure with relative ease, i.e. non-destructively and without complicated or time consuming process, and can also be readily reattached or coupled to the previously adjoining object or structure. Examples of a time consuming process include, but are not limited to, removing multiple threaded fasteners such as bolts.

Directional and/or relationary terms such as, but not limited to, left, right, top, bottom, upper, lower, above, below, vertical, horizontal, back, behind, front and lateral are relative to each other and are dependent on a specific orientation of an applicable element or article, and are used accordingly to aid in the description of the various embodiments; the directional or relationary terms may or may not be limiting and are not necessarily intended to be construed as limiting. The specific orientation for a removable mud flap assembly is upright, with the bracket assembly disposed at the top of the removable mud flap assembly and the flap member suspended from and hanging below the bracket assembly, as depicted in FIGS. 1, 2, 3, 4, 6, 8, and 9.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

A First Embodiment Removable Mud Flap Assembly

A first embodiment removable mud flap assembly 100 is illustrated shielding drive wheels 102 on a truck in FIGS. 1-5. The first embodiment removable mud flap assembly comprises a flap member 105 and a bracket assembly 110. As is familiar to persons skilled in the art, flap members are generally somewhat flexible, and thus deflect slightly in the wind at highway speeds. However, the flap members are firm enough to inhibit or prevent rapid fluttering or flailing in the wind as a vehicle travels at highway speeds. The flap member of the first embodiment comprises synthetic rubber including polymers such as, but not limited to, 1,3 butadiene and substituted butadienes, chloroprene, methylpropene, and isoprene. Some embodiments comprise natural rubber, vulcanized rubber, or other natural or synthetic polymers.

The bracket assembly 110 includes a fixed structure 115 and a removable structure 125. The fixed structure 115 is directly coupled to the truck chassis by first fasteners 117, and the removable structure 125 is directly coupled to the flap member 105 by second fasteners 127. The fasteners of the first embodiment are bolts having an outside diameter of about 9 mm. In other embodiments, the fasteners include, but are not limited to, bolts having diameters other than 9 mm, screws, lags, brads, or rivets. Embodiments include attachment means other than fasteners for securing the bracket assembly to a vehicle or flap member. The other attachment means include, but are not limited to, welds and epoxies or other robust adhesives.

In typical operation, the fixed structure remains secured to the truck and the removable structure remains secured to the flap member. In the first embodiment, the removable structure consists essentially of stainless steel plate about 2 mm thick, and the fixed structure is constructed substantially from stainless steel plate about 2 mm thick. The fixed and removable structures are each approximately 610 mm long.

In other embodiments, the removable mud flap assembly includes other metals and metal alloys, including but not limited to chrome plated steel, chrome-molybdenum steel alloys, aluminum, aluminum alloys, magnesium and magnesium alloys. Embodiments of removable mud flap assemblies comprise composites such as, but not limited to, carbon fibers, glass fibers, aramid fibers, or other fibers set in resins such as epoxy resins. Embodiments include polymers such as, but not limited to, polyesters; acrylonitrile butadiene styrene (ABS); polyacrylonitrile; polystyrene; polyetheretherketone (PEEK); polyimides; polyamides; polycarbonates; epoxide polymers; polyvinyl chloride; acrylate and methacrylate polymers; fluorinated polymers including, but not limited to, polytetrafluoroethylene, polyfluoroethylenepropylene, poly(tetrafluoroethylene-co-hexafluoropropylene-co-vinylidene fluoride, and polyvinylidene fluoride; polychloropene; polyisoprenes; polyolefins including, but not limited to, polyethylene (PE), polypropylene (PP) and polybutylene (PB); and polyurethanes.

The fixed structure 115 includes a fixed pin 119 and a release pin 120. The release pin of the first embodiment is spring loaded and retractable. The fixed pin resides on a first end of the fixed structure, the first end being designed and adapted to orient inwardly on the truck, as illustrated in FIGS. 1-4. The fixed pin of the first embodiment has no rotational and no translational degrees of freedom relative to the fixed structure. In some embodiments, the fixed pin can rotate along one axis within the fixed structure 115, but is translationally fixed therein, thus having one rotational degree of freedom and zero translational degree of freedom relative to the fixed structure.

The release pin 120 resides on the second end of the fixed structure 115, the second end being opposite the first end, and being designed and adapted to orient outwardly on the truck, as illustrated in FIGS. 1-4. The first and second ends of the fixed structure are not identified by reference characters, but are clearly identified as the inwardly oriented and outwardly oriented ends of the fixed structure, respectively. The release pin is easily accessible because it is disposed on the outwardly oriented end. Conversely, the fixed pin need not be handled or manipulated, and is thus appropriately disposed on the inwardly oriented end, which is less accessible to a user. The fixed pin and release pin of the first embodiment comprise hardened high-carbon steel.

Figure 5:
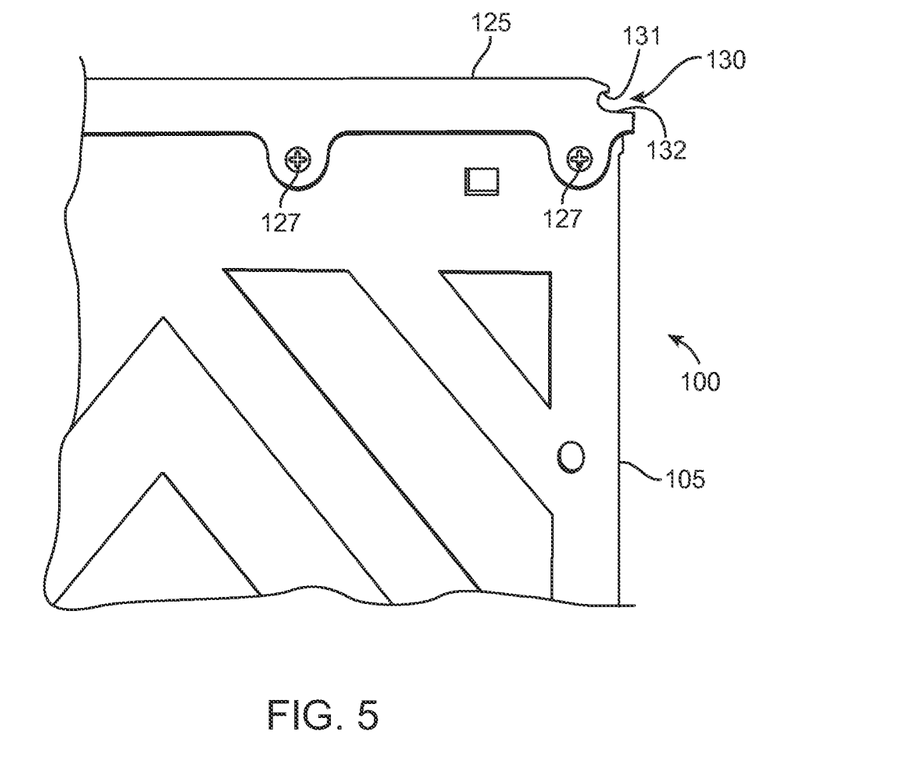
FIG. 5 is a perspective view of a removable mud flap assembly according to an embodiment.

The removable structure 125 comprises a first notch 129 and a second notch 130, the first and second notches being designed and adapted to receive the fixed pin 119 and the release pin 120, respectively. As best shown in FIG. 5, the second notch of the first embodiment is asymmetrical, having a notch upper boundary 131 that is shorter than a notch lower boundary 132. Conversely, the first notch of the first embodiment is symmetrical, with a notch upper boundary having about the same dimensions as the notch lower boundary. In some embodiments, the first and second notches are both asymmetrical. Variations include first and second embodiments that are both symmetrical.

Figure 1:
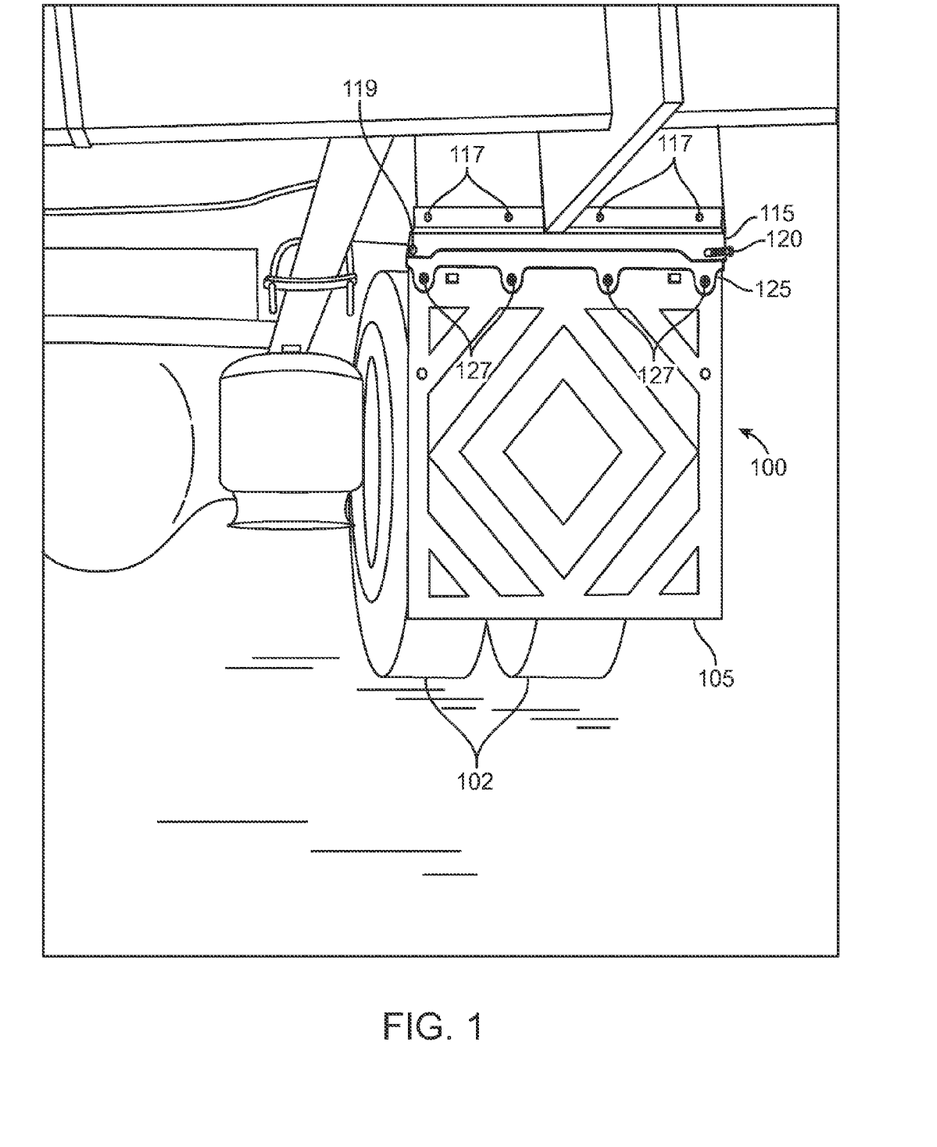
FIG. 1 is a rear, perspective view of a truck on which a removable mud flap assembly is installed, according to an embodiment.
Figure 2:
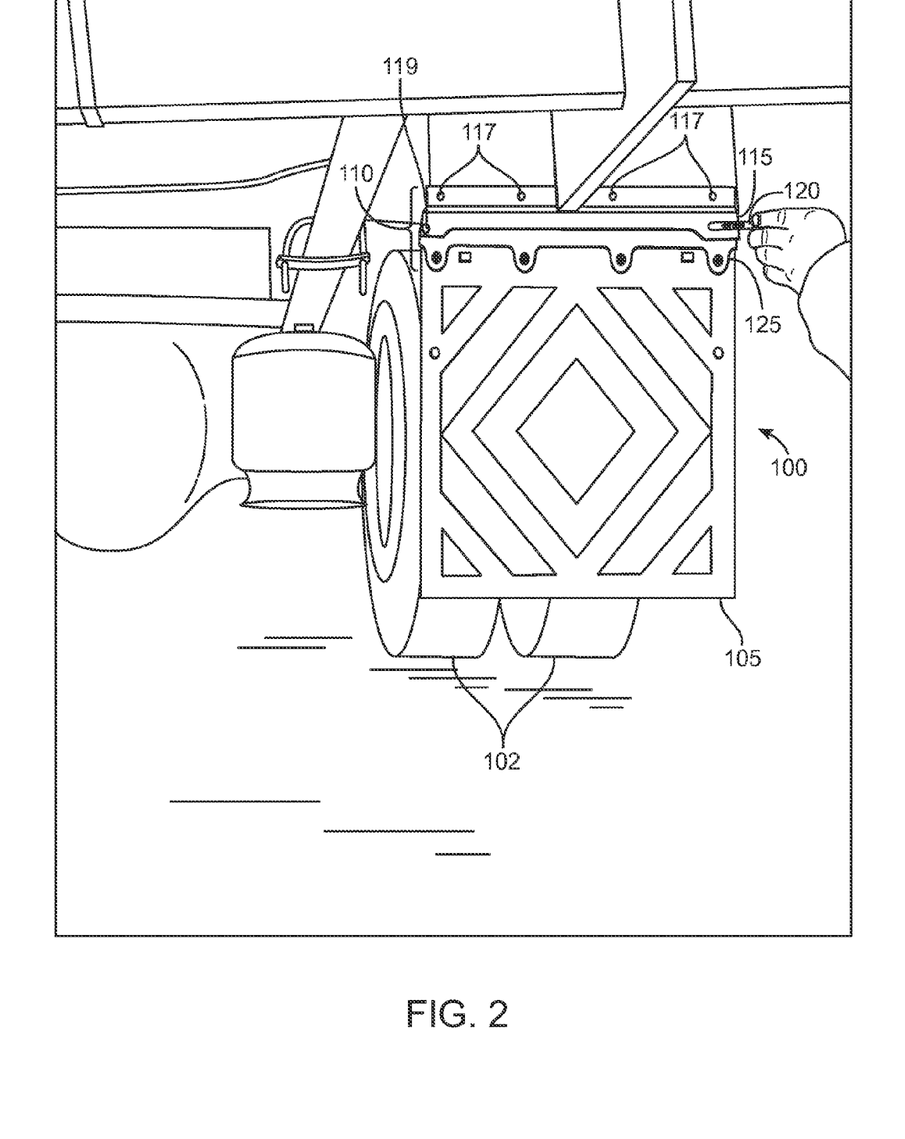
FIG. 2 is a rear, perspective view of a truck on which a removable mud flap assembly is installed, according to an embodiment.
Figure 3:
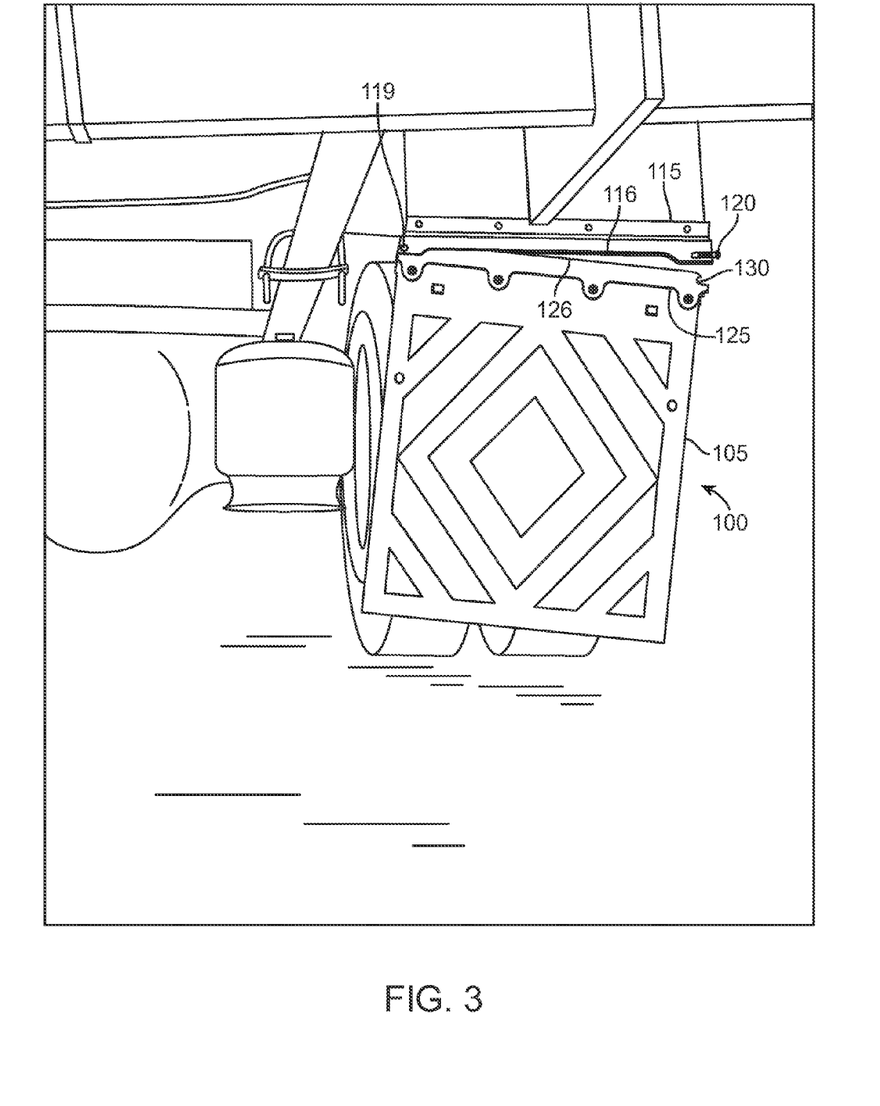
FIG. 3 is a rear, perspective view of a truck on which a removable mud flap assembly is installed, according to an embodiment.
Figure 4:
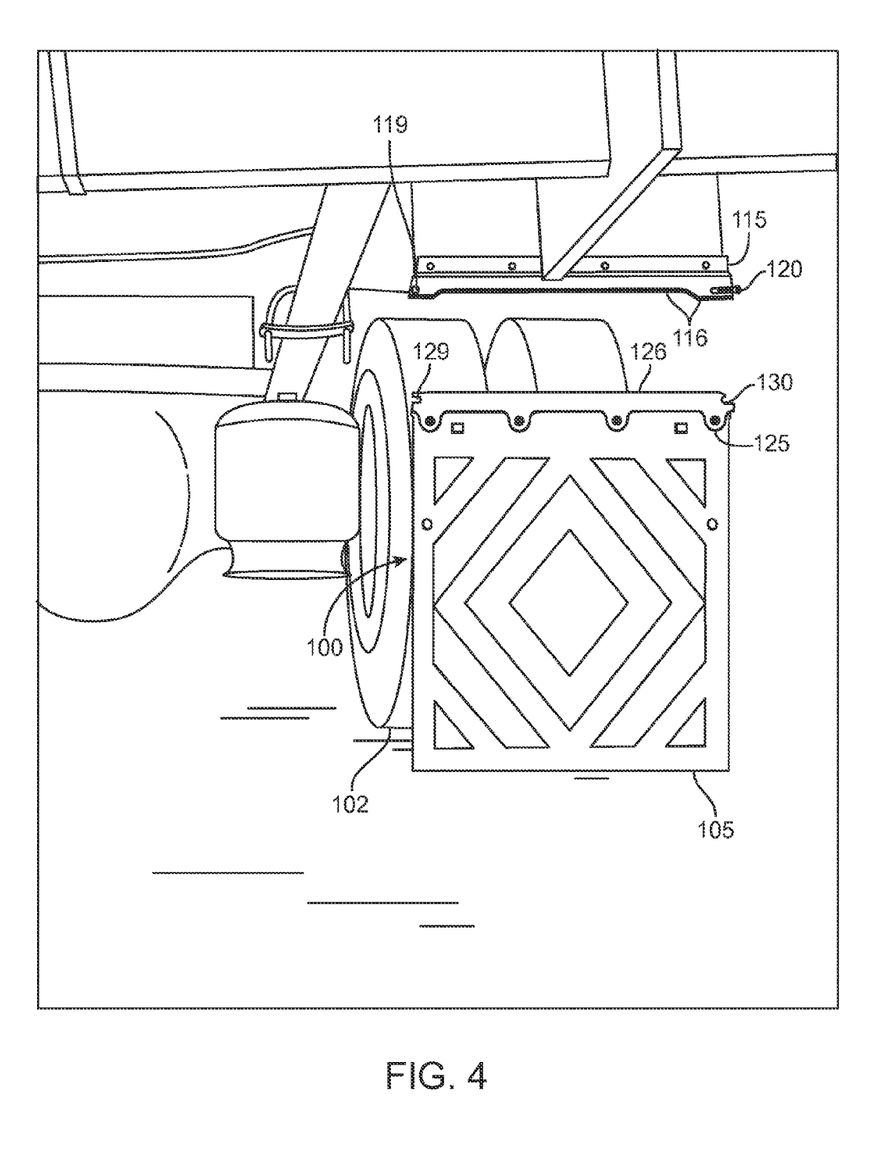
FIG. 4 is a rear, perspective view of a truck on which a removable mud flap assembly is installed, according to an embodiment.

FIGS. 1 and 2 illustrate the removable structure 125 securely installed in the fixed structure 115, with the fixed pin 119 residing in the first notch 129 and the release pin 120 residing in the second notch 130. So configured, an upper edge 126 of the removable structure 125 resides in a receiving slot 116 of the fixed structure 115, with the upper edge extending into the receiving slot by between approximately 20 mm and 33 mm. The upper edge 126 extends into the receiving slot 116 by a distance that is preferably at least 4 mm, more preferably at least 20 mm, and most preferably between 10 mm and 50 mm. The upper edge and receiving slot are best viewed in FIGS. 3 and 4. The first and second notches are obscured in FIG. 1 because the notches reside in the receiving slot. Accordingly, the first and second notches are best viewed in FIG. 4, where the removable structure 125 is completely separated from the fixed structure 115.

An Exemplary Method of Using a First Embodiment Removable Mud Flap Assembly

Referring now to FIGS. 2-5, an exemplary method of using a first embodiment removable mud flap assembly 100 is described. A first operation of the exemplary method includes providing the first embodiment removable mud flap assembly 100 installed on a truck, as illustrated in FIG. 1. So installed, the fixed pin 119 engages the first notch 129 and the release pin 120 engages the second notch 130, thereby securing the removable structure 125 to the fixed structure 115, with the upper edge 126 of the removable structure 125 residing in the receiving slot 116 of the fixed structure 115.

A second operation includes pushing, pulling, or otherwise moving the release pin 120 outwardly from a home position to a retracted position, such that the release pin retracts from within the second notch 130 and the second notch thus disengages from the release pin. FIG. 2 illustrates a user holding the release pin partially retracted. The release pin of the first embodiment travels outwardly from the home position approximately 10 mm before the release pin disengages from the second notch.

A third operation includes lowering the second end of the removable structure 125 away from the fixed structure 115, such that a portion of the upper edge 126 proximate the second end vacates the receiving slot 116, and the removable structure 125 rotates about the fixed pin 119, which resides within the first notch 129 during said rotation. The release pin 120 is spring loaded and therefore travels inwardly to the home position once the upper edge 126 at the second end recedes from within the receiving slot 116 and the user lets loose of the release pin.

A fourth operation includes shifting the removable structure 125 outwardly until the fixed pin 119 is substantially free of the first notch 129. In the first embodiment, the removable structure must travel outwardly at least 19 mm before the fixed pin disengages from the first notch.

A fifth operation includes separating the removable structure 125 entirely from the fixed structure 115, such that the upper edge 126 resides entirely outside the receiving slot 116. The flap member 105 and removable structure 125 to which it is coupled are thus free to move away from the fixed structure 115, which remains coupled to the truck.

A sixth operation includes installing tire chains on at least one of the drive wheels 102. The appearance and function of tire chains are familiar to persons skilled in the art, and tire chains are therefore not illustrated in any figures.

A seventh operation includes installing the flap member 105 and the removable structure 125 by performing the fifth though second operations in reverse. Briefly, the upper edge 126 at the first end of the removable member 125 is inserted into the receiving slot 116, and the removable member is shifted inwardly until the first notch 129 engages the fixed pin 119. Subsequently, the second end of the removable structure 125 is raised toward the fixed structure, and the upper edge 126 at the second end is inserted into the receiving slot 116 as the removable structure 125 rotates about the fixed pin 119, which resides at least partially within the first notch 129. The upper edge 126 proximate the second notch 130 presses against the release pin 120 and pushes the release pin into the retracted position until the second notch 130 is fully inserted into the receiving slot 116, whereupon the spring loaded release pin snaps into the home position with the second notch engaging the release pin. The removable structure is thus secured to the fixed structure, and the flap member 105 is thereby securely coupled to the truck.

A Second Embodiment Removable Mud Flap Assembly

A second embodiment removable mud flap assembly 200, illustrated in FIGS. 6-9, comprises a flap member 205 and a bracket assembly 210. The bracket assembly 210 includes a fixed structure 215 and a removable structure 225.

Figure 7A:
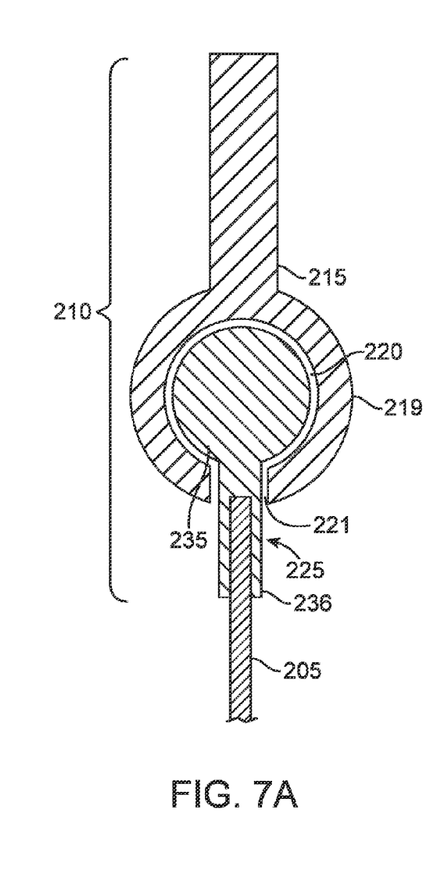
FIG. 7A is a transverse cross section view of a bracket assembly according to an embodiment.

As best shown in by the transverse cross section of the bracket assembly 210 illustrated in FIG. 7A, the fixed structure 215 comprises a horizontal tube 219 surrounding a longitudinal cavity 220, with a longitudinal gap 221 extending from outside the horizontal tube into the longitudinal cavity. The removable structure 225 comprises a horizontal rod 235 and a flange 236, the flange being directly coupled to the horizontal rod and extending radially therefrom.

When the bracket assembly 210 is intact, the removable structure 225 is secured to the fixed structure 215, with the horizontal rod 235 residing within the longitudinal cavity 220 and the flange 236 extending through the longitudinal gap 221. In the second embodiment, both the longitudinal cavity and the horizontal rod are approximately cylindrical, with the horizontal rod having an outside diameter of 13 mm and the longitudinal cavity having a diameter of 15 mm. The diameter of the longitudinal cavity can also be referred to as an inside diameter of the horizontal tube 219. In some embodiments, the longitudinal cavity or horizontal rod are not cylindrical. However, the longitudinal cavity must be large enough to receive the horizontal rod. Accordingly, regardless of their shapes, a transverse cross section of the horizontal rod fits entirely within a transverse cross section of the longitudinal cavity.

Figure 6:
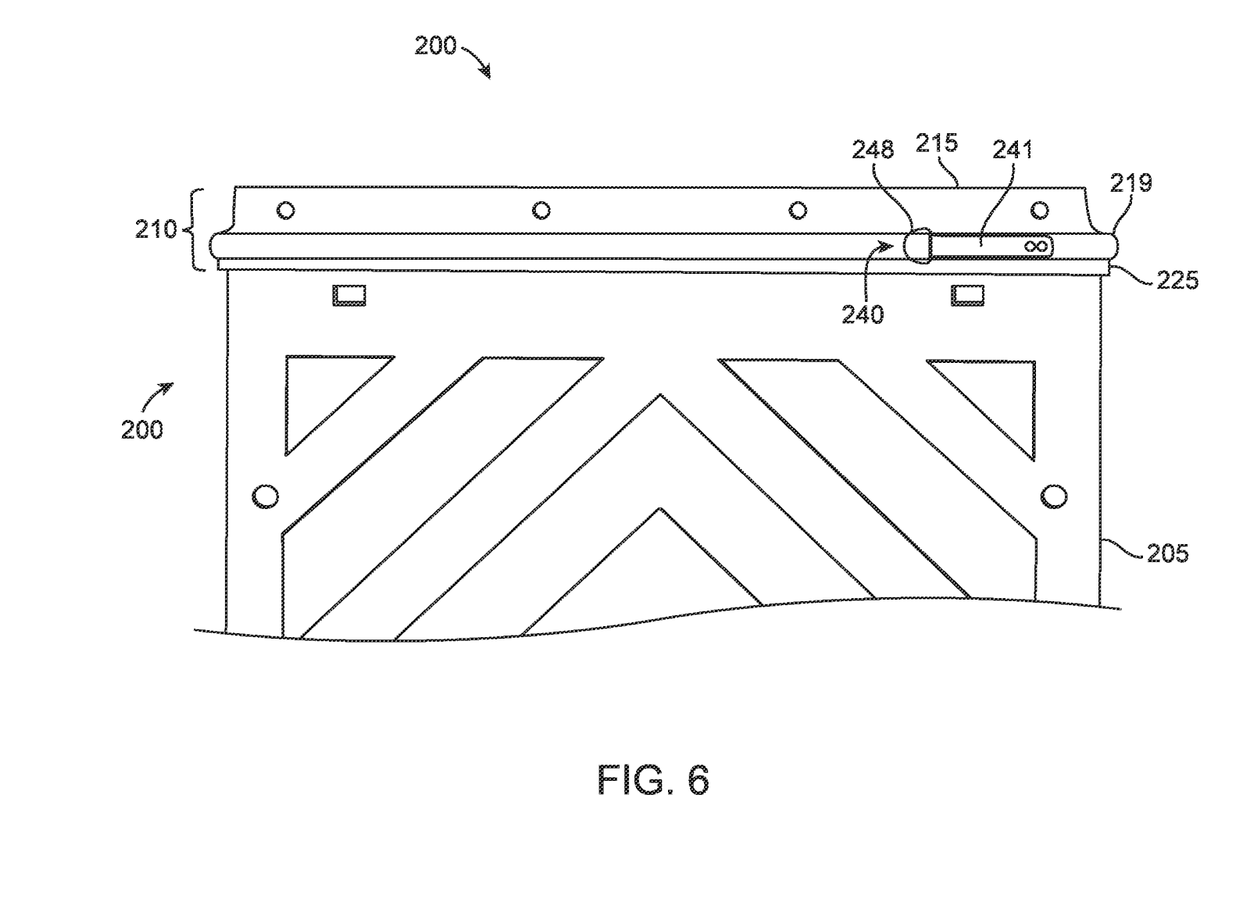
FIG. 6 is a perspective view of a removable mud flap assembly according to an embodiment.
Figure 8:
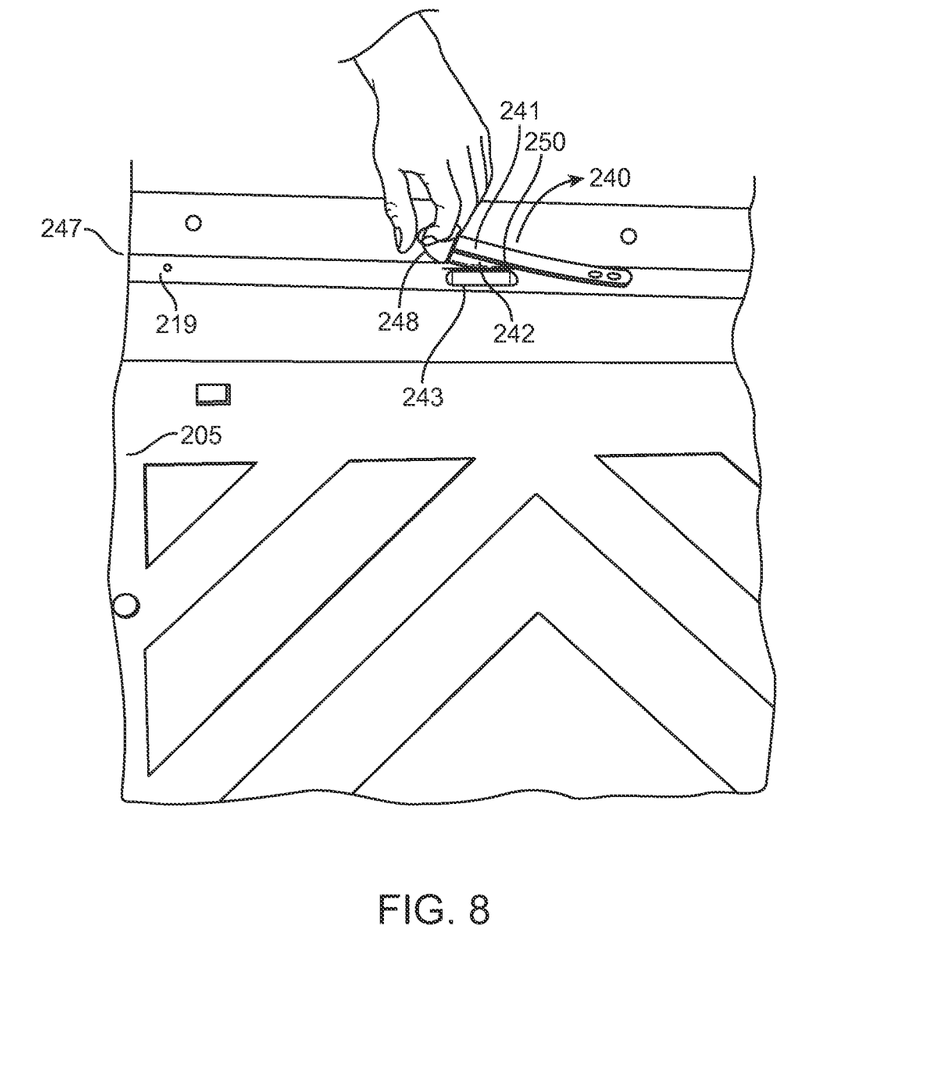
FIG. 8 is a perspective view of a removable mud flap assembly according to an embodiment.
Figure 9:
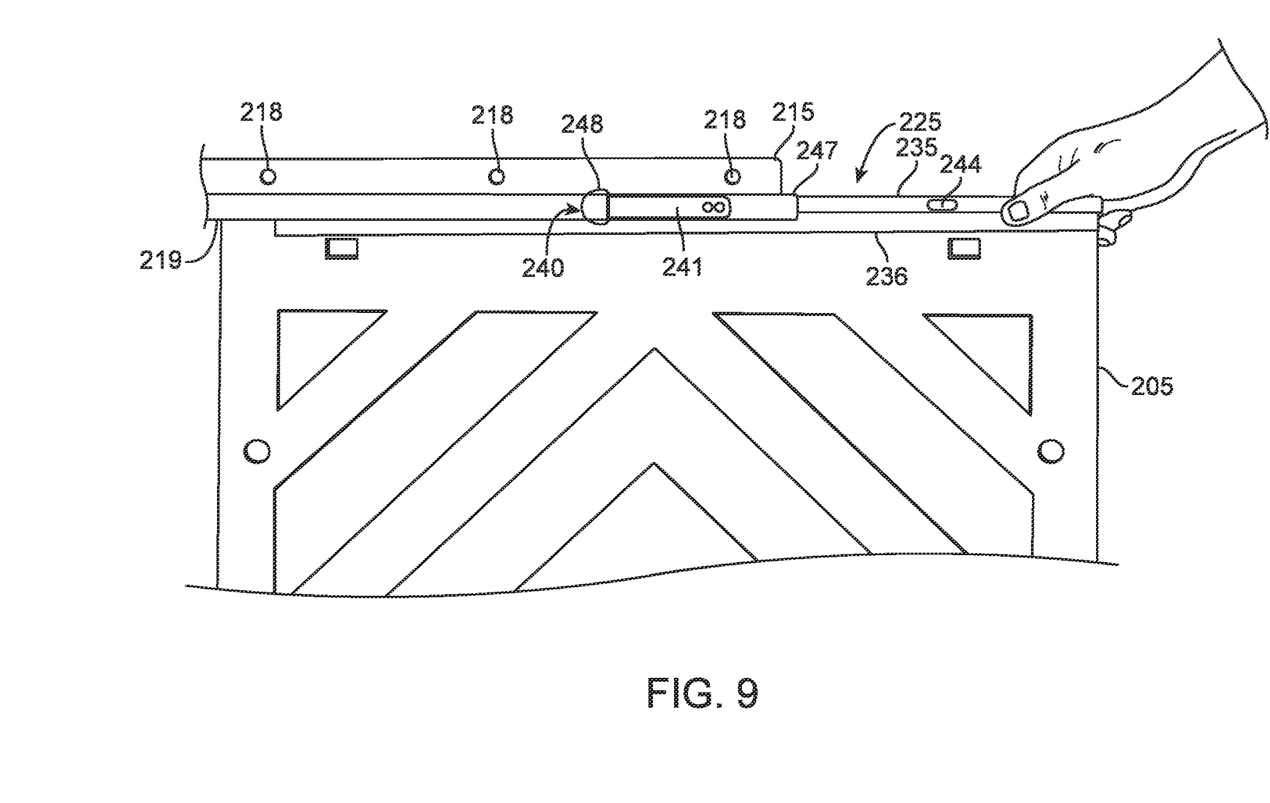
FIG. 9 is a perspective view of a removable mud flap assembly according to an embodiment.

Referring now to FIGS. 6, 8, and 9, the fixed structure 215 further comprises a locking assembly 240 and attachment apertures 218. The attachment apertures are used to secure the fixed structure to a vehicle, and are thus adapted to receive fasteners including, but are not limited to, bolts, screws, lags, brads, or rivets. As best shown in FIG. 8, the locking assembly 240 includes a spring member 241 from which protrudes a jut 242, the spring member being directly coupled to an external surface of the horizontal tube member 219. The locking assembly 240 is shown in a home position in FIG. 6 and in a retracted position in FIG. 8. When the locking assembly 240 is in the home position, the spring member 241 lays flat against the horizontal tube 219 of the fixed structure, and the jut 242 protrudes through a tube aperture 243 into the longitudinal cavity 220. The tube aperture 243 pierces a wall of the horizontal tube 219, providing a path from outside the horizontal tube into the longitudinal cavity 220.

In some embodiments, the horizontal rod is secured in place inside the horizontal tube by use of a removable pin that passes through both the horizontal tube and the horizontal rod along a transverse axis. Examples of removable pins include, but are not limited to, linchpins, hitch pins, split pins, cotter pins, and R-clips. Removal of the removable pin enables the horizontal rod to be readily removed from within the horizontal tube.

As illustrated in FIG. 8, the locking assembly 240 resides in a retracted position, with the spring member 241 deflected away from the horizontal tube 219 to reveal the tube aperture 243. The spring member is deflected away from the horizontal tube by action of a user pulling a D-ring 248 directly coupled to the spring member. Conversely, in FIG. 6, the locking assembly 240 resides in a home position with the spring member 241 pressed flat against an outside surface of the horizontal tube 225, thereby obscuring the tube aperture 243. The locking assembly of the second embodiment is centrally disposed on the bracket assembly 210, proximate a middle of the assembly. In other embodiments, the locking assembly can be disposed elsewhere along the bracket assembly.

When the bracket assembly 210 is intact, with the horizontal rod 235 of the removable structure 225 residing fully inserted in the longitudinal cavity 220, and the locking assembly 240 in the home position, the jut 242 protrudes not only through the tube aperture 243, but also into a rod aperture 244. The rod aperture is a void in the horizontal rod adapted to receive the jut. The jut 242 protruding through the tube aperture into the rod aperture 244 restricts movement of the horizontal rod 235 within the longitudinal cavity 220, thereby helping to secure the removable structure 225 to the fixed structure 215. FIG. 6 shows the bracket assembly intact with the locking assembly 240 in the home position. Thus the jut 242 protrudes through the tube aperture 243 and into the rod aperture 244 where the second embodiment removable mud flap assembly 200 is configured as shown in FIG. 6, although the jut 242, tube aperture 243, and rod aperture 244 are not visible in FIG. 6, being obscured by the spring member 241 of the locking assembly 240.

Figure 7B:
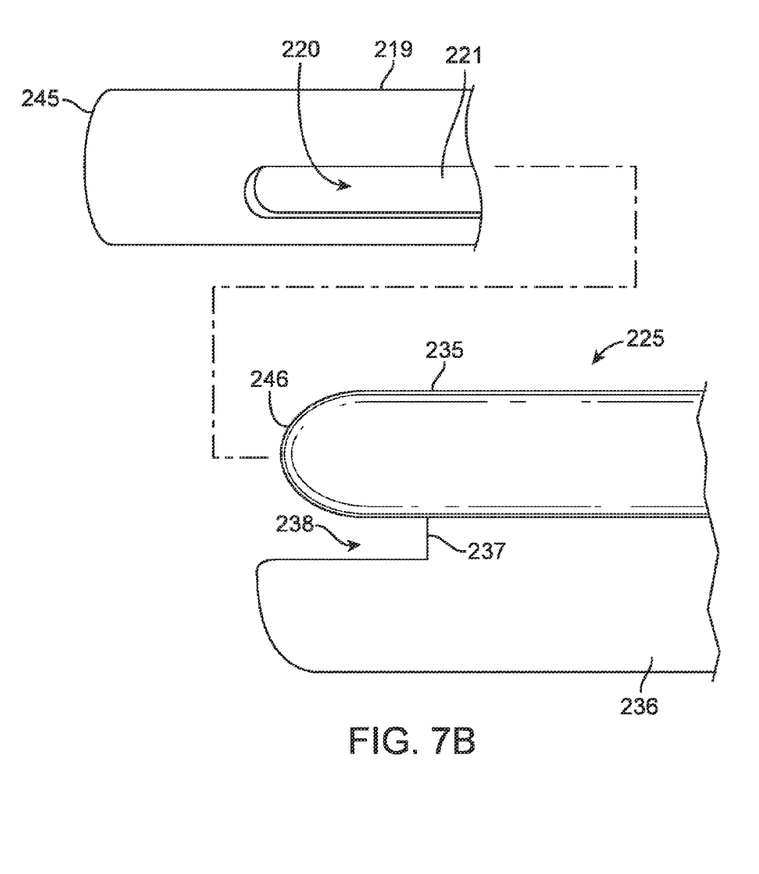
FIG. 7B is a perspective view of a bracket assembly according to an embodiment.

FIG. 7B illustrates a first end 245 of the horizontal tube 219, and a corresponding first end 246 of the horizontal rod 235. The longitudinal gap 221 of the horizontal tube 219 stops shy of the horizontal tube first end 245 by about 24 mm. Similarly, a first attached end 237 of the flange 236 stops shy of the horizontal rod first end 246 by about 24 mm. Part of the flange 236 extends beyond the flange first attached end 237, creating a flange cutout 238 that extends about 24 mm from the horizontal rod first end 246. The flange cutout 238 is thus adapted permit the horizontal rod 235 to extend beyond the longitudinal gap 221 by about 24 mm when the horizontal rod is inserted fully into the longitudinal cavity 220. The flap member 205 is omitted in FIG. 7B.

FIGS. 8 and 9 illustrate how the horizontal rod 235 is uninstalled from within the horizontal tube 219 in order to remove the flap member 205 from a vehicle while leaving the fixed member 215 attached to the vehicle. As illustrated in FIG. 8, lifting the spring member 241 of the locking assembly 240 away from the horizontal tube 219 retracts the jut 242 from within the rod aperture 244, and at least partially from within the tube aperture 243. Accordingly, the horizontal rod 235 is free to slide from within the horizontal tube 219 by exiting out the horizontal tube second end 247, which is open to form a passthrough into the longitudinal cavity 220. As described above, removing the flap member 205 from the vehicle is readily accomplished by one person in less than 10 seconds without the use of tools.

Installing the flap member 205 on the vehicle is accomplished by inserting the horizontal rod 235 of the removable structure 225 into the longitudinal cavity 220 that resides within the horizontal tube 219 of the fixed structure 215, with the flange 225 extending from within the longitudinal cavity 220 through the longitudinal gap 221. When the horizontal rod 235 is fully inserted into the longitudinal cavity 220, the jut 242 is forced into the rod aperture 244 by the spring member 241 of the locking assembly 240. The horizontal rod 235 is thus secured within the horizontal tube 219, the bracket assembly 210 is consequently intact, and the flap member 205 is securely coupled to the vehicle. Installing the flap member as described above is readily accomplished by one person in less than 10 seconds, without using hand tools or other tools. A ramped leading edge 250 of the jut 242 enables the horizontal rod 235 to push the jut 242 out of the way, thereby deflecting the spring member 241, during the insertion.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:
1. A removable mud flap assembly comprising:
   a removable structure coupled to a flap member, the flap member being suspended below the removable structure and the removable structure including an upper edge, a first notch, and a second notch, the first and second notches residing at opposite ends of the removable structure and below the upper edge;
   a fixed structure removably coupled to the removable structure, the fixed structure including:
      a first pin including a portion residing within the first notch;
      a second pin including a portion residing within the second notch;
      a receiving slot within which resides the upper edge, wherein the upper edge is confined within the receiving slot while the first pin portion resides within the first notch and the second portion resides within the second notch;
   wherein:
      the second pin is a release pin having a home position and a retracted position, the home position including the release pin having a portion residing within the first notch, and the retracted position including the release pin being retracted from within the second notch while the upper edge resides within the receiving slot;

the second notch comprises an upper notch boundary and a lower notch boundary, the upper notch boundary being shorter than the lower notch boundary; and the release pin is spring loaded, a spring tension of the spring loading applying force to the release pin, the force being toward the home position and away from the retracted position.

2. The removable mud flap assembly of claim 1, wherein the flap member is adapted to be uncoupled from the fixed structure without using hand tools.

3. A removable mud flap assembly combination comprising:
a vehicle including a chassis supported by a wheel;
the removable mud flap assembly of claim 2, wherein:
the fixed structure is coupled to the chassis; and
the flap member resides behind the wheel and proximate thereto.

4. A method of using the removable mud flap assembly combination of claim 3 comprising:
moving the release pin from the home position to the retracted position;
lowering the second notch away from the fixed structure while a portion of the upper edge vacates the receiving slot, the removable structure rotates about the first pin, and a portion of the upper edge remains within the receiving slot.

5. The method of claim 4, further comprising removing the upper edge entirely from within the receiving slot and uncoupling the flap assembly from the vehicle.

6. The method of claim 5, further comprising inserting a portion of the upper edge into the receiving slot and inserting at least a portion of the first pin into the first notch.

7. The method of claim 6, further comprising lifting the second notch until at least a portion of the release pin enters the second notch, wherein the removable structure rotates about the first pin during said lifting the second notch.

8. A removable mud flap assembly comprising:
a removable structure including:
a horizontal rod including a rod aperture;
a flange projecting from the horizontal rod, the flange being coupled directly to the horizontal rod and to a flap member, the flap member being coupled directly to the removable structure;
a fixed structure removably coupled to the removable structure, the fixed structure including:
a horizontal tube including a longitudinal cavity, a longitudinal gap and a tube aperture leading from outside the horizontal tube into the longitudinal cavity, wherein the horizontal rod resides within the longitudinal cavity and the flange extends through the longitudinal gap from within the longitudinal cavity to outside the horizontal tube;
a locking assembly including:
a spring member coupled directly to an external surface of the horizontal tube; and
a jut coupled directly to and projecting from the spring member, the jut having a ramped edge;
wherein the locking assembly includes a home position and a retracted position, the home position including the spring member residing flat against the horizontal tube and the jut projecting through the tube aperture into the rod aperture to restrict movement of the horizontal rod in the horizontal tube, and the retracted position including the jut residing outside the rod aperture with the spring member being deflected away from the horizontal tube.

9. The removable mud flap assembly of claim 8, wherein the horizontal rod is generally cylindrical and the flange projects radially therefrom.

10. The removable mud flap assembly of claim 8, wherein the flap member is adapted to be non-destructively uncoupled from the fixed structure without using hand tools.

11. A removable mud flap assembly combination comprising:
a vehicle including a chassis supported by a wheel;
the removable mud flap assembly of claim 8, wherein:
the fixed structure is coupled to the chassis; and
the flap member resides behind the wheel and proximate thereto; and
the horizontal tube is open at an end and adapted to receive the horizontal rod therethrough.

12. A method of using the removable mud flap assembly of claim 11 comprising:
moving the locking assembly from the home position to the retracted position;
removing the horizontal rod from within the tube cavity through the horizontal tube open end.

13. The method of claim 12, further comprising:
inserting the horizontal rod into the tube cavity through the horizontal tube open end;
inserting the jut into the rod aperture, thereby securing the horizontal rod in the tube cavity.

14. A removable mud flap assembly comprising:
a removable structure coupled to a flap member, the flap member being suspended below the removable structure and the removable structure including an upper edge, a first notch, and a second notch, the first and second notches residing at opposite ends of the removable structure and below the upper edge;
a fixed structure removably coupled to the removable structure, the fixed structure including:
a fixed pin including a portion residing within the first notch;
a release pin having a home position wherein at least a portion of the release pin resides within the first notch, and
a receiving slot within which resides the upper edge, wherein:
the upper edge is confined within the receiving slot while the fixed pin portion resides within the first notch and the release pin portion resides within the second notch;
the retracted position includes the release pin being retracted from within the second notch while the upper edge resides within the receiving slot; and
the release pin is spring loaded, the spring tension of the spring loading applying force to the release pin toward the home position and away from the retracted position.

15. A method of using the removable mud flap assembly of claim 14 comprising:
moving the release pin from the home position to the retracted position;
adjusting the second notch away from the fixed structure while a portion of the upper edge vacates the receiving slot, the removable structure rotates about the first pin, and a portion of the upper edge remains within the receiving slot; and
removing the upper edge entirely from within the receiving slot; and
uncoupling the flap assembly from the fixed structure.

* * * * *